United States Patent
Kumagai

(10) Patent No.: US 7,733,070 B2
(45) Date of Patent: *Jun. 8, 2010

(54) MULTI-OUTPUT TYPE DC/DC CONVERTER

(75) Inventor: Keizo Kumagai, Atsugi (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 547 days.

This patent is subject to a terminal disclaimer.

(21) Appl. No.: 11/692,707

(22) Filed: Mar. 28, 2007

(65) Prior Publication Data
US 2007/0285072 A1   Dec. 13, 2007

(30) Foreign Application Priority Data
Jun. 13, 2006   (JP) ............................. 2006-163252

(51) Int. Cl.
G05F 1/577 (2006.01)
(52) U.S. Cl. ..................... 323/267; 206/285
(58) Field of Classification Search ............. 323/206, 323/267, 285, 282, 284, 271, 225
See application file for complete search history.

(56) References Cited
U.S. PATENT DOCUMENTS
7,372,239 B2 *   5/2008   Kumagai et al. ............ 323/267
2007/0121350 A1 *   5/2007   Duvnjak ................... 363/21.01

FOREIGN PATENT DOCUMENTS
JP   2005-117886 A   4/2005
JP   2006-121563 A   5/2006

* cited by examiner

Primary Examiner—Adolf Berhane
Assistant Examiner—Matthew Grubb
(74) Attorney, Agent, or Firm—Frishauf, Holtz, Goodman & Chick, P.C.

(57) ABSTRACT

A multi-output type DC/DC converter including: a reactor connected to a direct-current power supply; a first switching circuit to apply a current to the reactor; a second switching to switch an output from the reactor to any one of output terminals; output voltage detection units to detect voltages of the output terminals; comparison circuits to compare outputs of the output voltage detection units with a waveform signal of a predetermined frequency; and an output selection unit to receive outputs of the comparison circuits as inputs, the output selection unit selecting an output of a comparison circuit, the output having an earlier rise or an earlier fall, to generate a plurality of control signals pertaining to on and off of the first switching circuit and/or the second switching circuit, the output selection unit treating the plurality of control signals in accordance with a predetermined priority order when the outputs of the plurality of comparison circuits change almost at the same time, wherein a current generated by a discharge of energy accumulated in the reactor is output to any one of the output terminals in accordance with the control signals generated by the output selection unit.

10 Claims, 8 Drawing Sheets

MULTI-OUTPUT TYPE DC/DC CONVERTER

BACKGROUND OF THE INVENTION

1. Field of the Invention

The present invention relates to a switching power supply apparatus and a multi-output type DC/DC converter outputting a plurality of voltages from one input voltage, and more particularly to a DC/DC converter provided with a selection circuit and a priority circuit for switching output currents according to the level of each voltage output.

2. Related Art

There is a DC/DC converter as a power supply apparatus converting a direct-current input voltage into a direct-current voltage of an electric potential different from that of the input voltage to output the converted direct-current voltage. Moreover, there is a circuit shown in FIG. 8 as a multi-output type DC/DC converter outputting a plurality of direct-current voltages having different electric potentials to one direct-current input. Such a multi-output DC/DC converter is disclosed in, for example, JP-A 2005-117886.

The DC/DC converter shown in FIG. 8 turns on and off a main switch SW0 based on a pulse P1 or a pulse P2, which are output from comparators CMP1 and CMP2, respectively, the DC/DC converter selectively turns on any one of change-over switches SW1 and SW2 at a predetermined period based on the output of a frequency divider to apply the output current of an inductor (reactor) L to a rectification & smoothing circuit 16a or 16b in a time division method. Thereby, the DC/DC converter outputs direct-current voltages Vout1 and Vout2, which are converted to voltages having desired levels severally, from a first output terminal OUT1 and a second output terminal OUT2.

Because the multi-output type DC/DC converter as shown in FIG. 8 switches the output current of the inductor L by the time division method, the multi-output type DC/DC converter has the advantages of being capable of decreasing the number of inductors, and of being capable of attaining the miniaturization of the direct-current power supply apparatus. However, because the multi-output type DC/DC converter of FIG. 8 distributes the output current of the inductor L to the first output terminal OUT1 and the second output terminal OUT2 at a predetermined period (fixed), the multi-output type DC/DC converter has a problem of the difficulty of keeping the desired electric potentials if the current ratio of the loads connected to the two output terminals greatly changes.

To put it concretely, for example, there is examined the case where, in a system using a multi-output type DC/DC converter the period of the time division system of which has been designed on the supposition that the ratio of the consumption current of the load connected to the first output terminal OUT1 to the consumption current of the load connected to the second output terminal OUT2 is 2 to 1, the ratio of the consumption current of the load of the first output terminal OUT1 and the consumption current of the load of the second output terminal OUT2 is suddenly reversed to be 1 to 2. In this case, if the period of the time division system is fixed, there is the possibility of producing the situation in which the output voltage Vout2 of the second output terminal OUT2, the load of which has increased, does not reach a desired electric potential, and on the other hand in which the output voltage Vout1 of the first output terminal OUT1, the load of which has decreased, becomes higher than the desired electric potential.

In order to avoid such a situation, the inventors of the present invention filed the invention of providing an output selection circuit generating an on-off control signal of a switching circuit that monitors the outputs of comparison circuits to select the output of earlier one for switching the path of the current flowing through an reactor in a multi-output type DC/DC converter including an output voltage detection unit and the comparison circuit (PWM comparator) to each output (Japanese Patent Application No. 2006-121563). However, it became apparent that it was apprehended that, even if the output selection circuit was configured to select the earlier one of the output signals of a plurality of comparison circuits and to intercept the other output signals, when the output signals from a plurality of comparison circuits were input almost at the same time, it was impossible to intercept the signals input later owing to the delay time in the inside of logic circuits and the like, and that the state in which the drive circuits on the subsequent stages did not operate was thereby caused.

SUMMARY

An object of the present invention is to provide a multi-output type DC/DC converter that intermittently applies an input voltage to a reactor (inductor) to flow a current and distributes the output from the reactor to a plurality of output terminals by a time division method for outputting a plurality of voltages, the multi-output type DC/DC converter capable of preventing the output voltages from greatly shifting from desired electric potentials owing to changes of loads to output stable direct-current voltages, the multi-output type DC/DC converter preventing the production of an undesirable control state even when the outputs of the comparison circuits provided to the respective plural outputs change almost at the same time.

In accordance with a first aspect of the invention, the multi-output type DC/DC converter includes:

a reactor connected to a direct-current power supply;

a first switching circuit including one or more switches to apply a current to the reactor;

a second switching circuit including one or more switches to switch an output from the reactor to any one of a plurality of output terminals;

a plurality of output voltage detection units to detect voltages of the plurality of output terminals;

a plurality of comparison circuits to compare outputs of the plurality of output voltage detection units with a waveform signal of a predetermined frequency; and an output selection unit to receive outputs of the plurality of comparison circuits as inputs, the output selection unit selecting an output of a comparison circuit, the output having an earlier rise or an earlier fall, to generate a plurality of control signals pertaining to on and off of the first switching circuit and/or the second switching circuit, the output selection unit treating the plurality of control signals in accordance with a predetermined priority order when the outputs of the plurality of comparison circuits change almost at the same time, wherein a current generated by a discharge of energy accumulated in the reactor is output to any one of the plurality of output terminals in accordance with the control signals generated by the output selection unit.

In accordance with a second aspect of the invention, the multi-output type DC/DC converter includes:

a reactor connected to a direct-current power supply;

a first switching circuit including one or more switches to apply a current to the reactor;

a second switching circuit including one or more switches to switch an output from the reactor to any one of a plurality of output terminals;

a plurality of output voltage detection units to detect voltages of the plurality of output terminals;

a plurality of comparison circuits to compare outputs of the plurality of output voltage detection units with a waveform signal of a predetermined frequency;

an output selection circuit to receive outputs of the plurality of comparison circuits as inputs, the output selection circuit selecting an output of a comparison circuit, the output having an earlier rise or an earlier fall, to generate a plurality of control signals pertaining to on and off of the first switching circuit and/or the second switching circuit; and a priority circuit to treat the plurality of control signals in accordance with a predetermined priority order when the plurality of control signals of the output selection circuit change almost at the same time, wherein a current generated by a discharge of energy accumulated in the reactor is output to any one of the plurality of output terminals in accordance with the control signals generated by the output selection unit.

In accordance with a third aspect of the invention, the multi-output type DC/DC converter includes:

a reactor connected to a direct-current power supply;

a first switching circuit including one or more switches to apply a current to the reactor;

a second switching circuit including one or more switches to switch an output from the reactor to any one of a plurality of output terminals;

a plurality of output voltage detection units to detect voltages of the plurality of output terminals;

a plurality of comparison circuits to compare outputs of the plurality of output voltage detection units with a waveform signal of a predetermined frequency;

an output selection circuit to receive outputs of the plurality of comparison circuits as inputs, the output selection circuit selecting an output of a comparison circuit, the output having an earlier rise or an earlier fall, to generate a plurality of control signals pertaining to on and off of the first switching circuit and/or the second switching circuit; and a drive logic circuit to output a signal performing on-off drive of the first switching circuit and a signal performing on-off drive of the second switching circuit based on the plurality of control signals generated by the output selection circuit, and to treat the plurality of control signals in accordance with a predetermined priority order when the plurality of control signals change almost at the same time, wherein a current generated by a discharge of energy accumulated in the reactor is output to any one of the plurality of output terminals in accordance with the control signals generated by the output selection circuit.

DETAILED DESCRIPTION OF THE PREFERRED EMBODIMENTS

In the following, the preferred embodiments of the present invention will be described, referring to the attached drawings.

Figure 1:
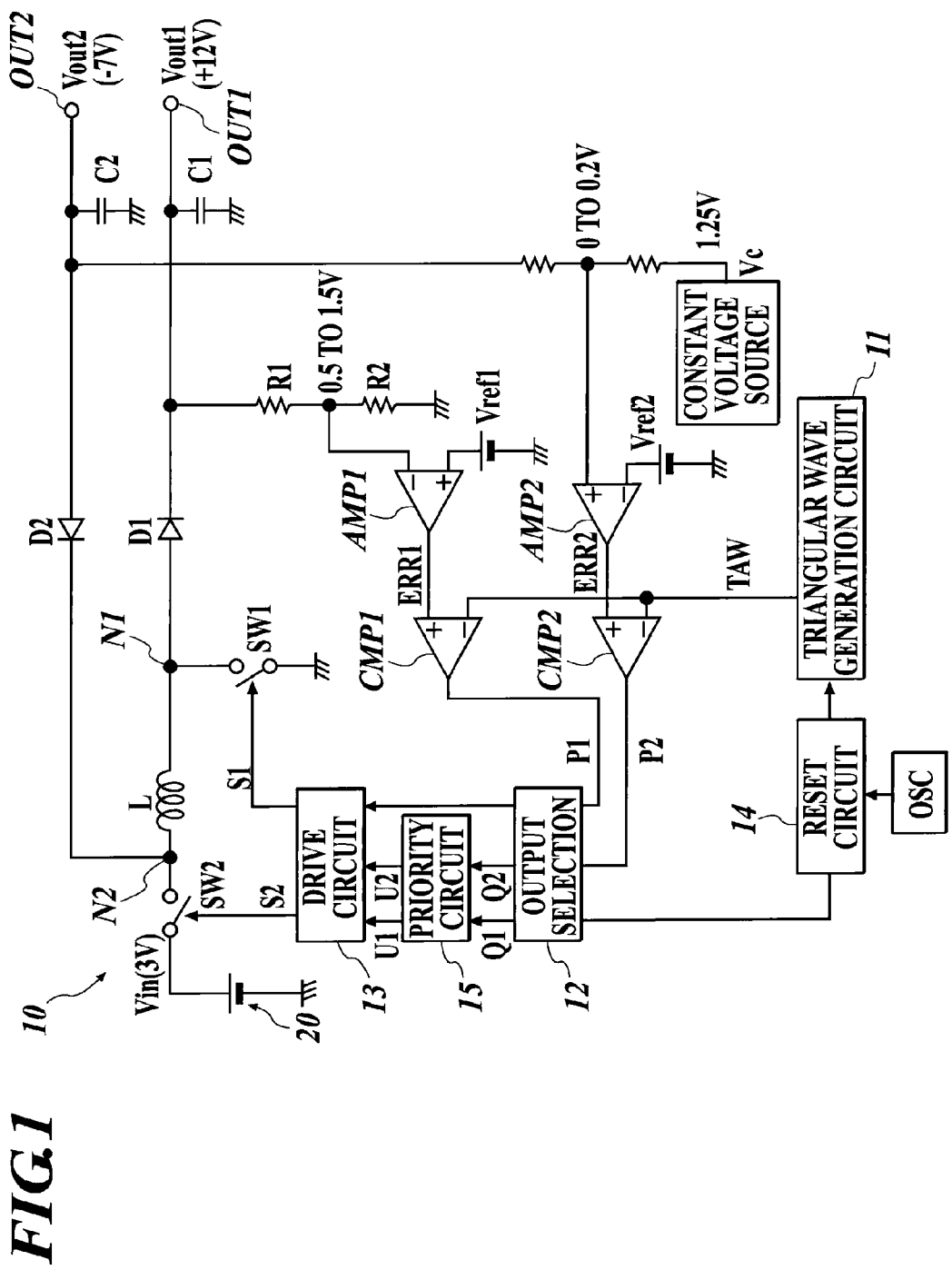
FIG. 1 is a configuration diagram showing a multi-output type DC/DC converter according to a first embodiment of the present invention.

FIG. 1 is a configuration diagram showing a multi-output type DC/DC converter of a first embodiment of the present invention.

The multi-output type DC/DC converter 10 of the embodiment is a boosting & inverting type converter. The boosting & inverting type converter turns on switches SW1 and SW2, which are constructed of transistors such as a MOSFET, to apply an input voltage Vin from a direct-current power supply 20 to a reactor L for flowing an current therethrough. The boosting & inverting type converter thus applies a current to flow on the output side from the reactor L to perform voltage output. The multi-output type DC/DC converter 10 outputs two kinds of output voltages Vout1 and Vout2 to two output terminals OUT1 and OUT2, respectively, by switching of the switches in the above boosting & inverting type converter.

The multi-output type DC/DC converter 10 of the embodiment includes the reactor L accumulating electric energy, a switch SW2 provided between the direct-current power supply 20 and the reactor L for applying an input voltage Vin to the reactor L intermittently by the on-off action of the switch SW2, a first diode D1 connected between the reactor L and the first output terminal OUT1 in the forward direction of the diode D1, a second diode D2 connected between a connection node N2 of the switch SW2 and the reactor L and the second output terminal OUT2 in the backward direction of the diode D2, a switch SW1 connected between a connection node N1 of the reactor L and the first diode D1 and the ground, and smoothing capacitors C1 and C2 connected between the output terminals OUT1 and OUT2 and the ground, respectively.

The converter 10 accumulates energy into the reactor L by turning on the switches SW1 and SW2, and outputs a boosted voltage Vout1 to the output terminal OUT1 by turning off the switch SW1. Moreover, the converter 10 accumulates energy into the reactor L by turning on the switches SW1 and SW2, and outputs an inverse voltage (negative voltage) Vout2 to the output terminal OUT2 by turning off the switch SW2. To put it concretely, the converter 10 is configured so as to output, for example, the output voltage Vout1 of +12 V and the output voltage Vout2 of –7 V to the input voltage Vin of 3 V by the PWM switching control of the switches SW1 and SW2.

The DC/DC converter 10 of the embodiment further includes divided resistances R1 and R2 connected between the output terminal OUT1 and the ground in series in order to detecting the level of the output voltage Vout1, divided resisters R3 and R4 connected between the output terminal OUT2 and a terminal to which a constant voltage Vc is applied in series in order to detect the level of the output voltage Vout2, and error amplifier circuits AMP1 and AMP2 comparing the detected voltages with predetermined reference voltages Vref1 and Vref2, respectively, to output voltages according to electric potential differences.

Furthermore, the DC/DC converter 10 includes a triangular wave generation circuit 11 generating a triangular wave TAW of a predetermined frequency, the PWM comparators CMP1 and CMP2 comparing the generated triangular wave with the outputs ERR1 and ERR2 of the error amplifier circuits AMP1 and AMP2, respectively, to generate PWM control pulses P1 and P2, respectively, an output selection circuit 12 selecting an output pulse having an earlier rise between the outputs of these comparators CMP1 and CMP2 to generate control signals Q1 and Q2 for turning on and off of the switches SW1 and SW2, respectively, according to the selected pulse, a drive circuit (driver) 13 generating on-off drive signals S1 and S2 according to the control signals Q1 and Q2 from the output selection circuit 12, respectively, to apply the generated on-off drive signals S1 and S2 to the switches SW1 and SW2, respectively, and a priority circuit 15 outputting any preferential one of the control signals Q1 and Q2 to the drive circuit 13 when the control signals Q1 and Q2 from the output selection circuit 12 are simultaneously input into the priority circuit 15. Furthermore, the DC/DC converter 10 includes a reset circuit 14 prescribes the timing of a changing point of the triangular wave TAW to be generated by giving a reset to the triangular wave generation circuit 11 based on an oscillation signal from an oscillation circuit OSC, which reset circuit 14 further resets the output selection circuit 12 in synchronization with the triangular wave TAW.

The resistance values of the divided resistance R1 and R2 for detecting the output voltage Vout1 are set so that a voltage within the range of from 0.5 V to 1.5 V may be input into the error amplifier circuit AMP1 when a constant voltage of, for example, 1.25 V is applied to the resister R2 and the output voltage Vout1 is changing within the range of from 10 V to 15 V. Moreover, the resistance values of the divided resisters R3 and R4 for detecting the output voltage Vout2 are set so that a voltage within the range of from 0 V to 0.2 V may be input into the error amplifier circuit AMP2 when the output voltage Vout2 is changing within the range of from −5 V to −9 V.

Figure 2:
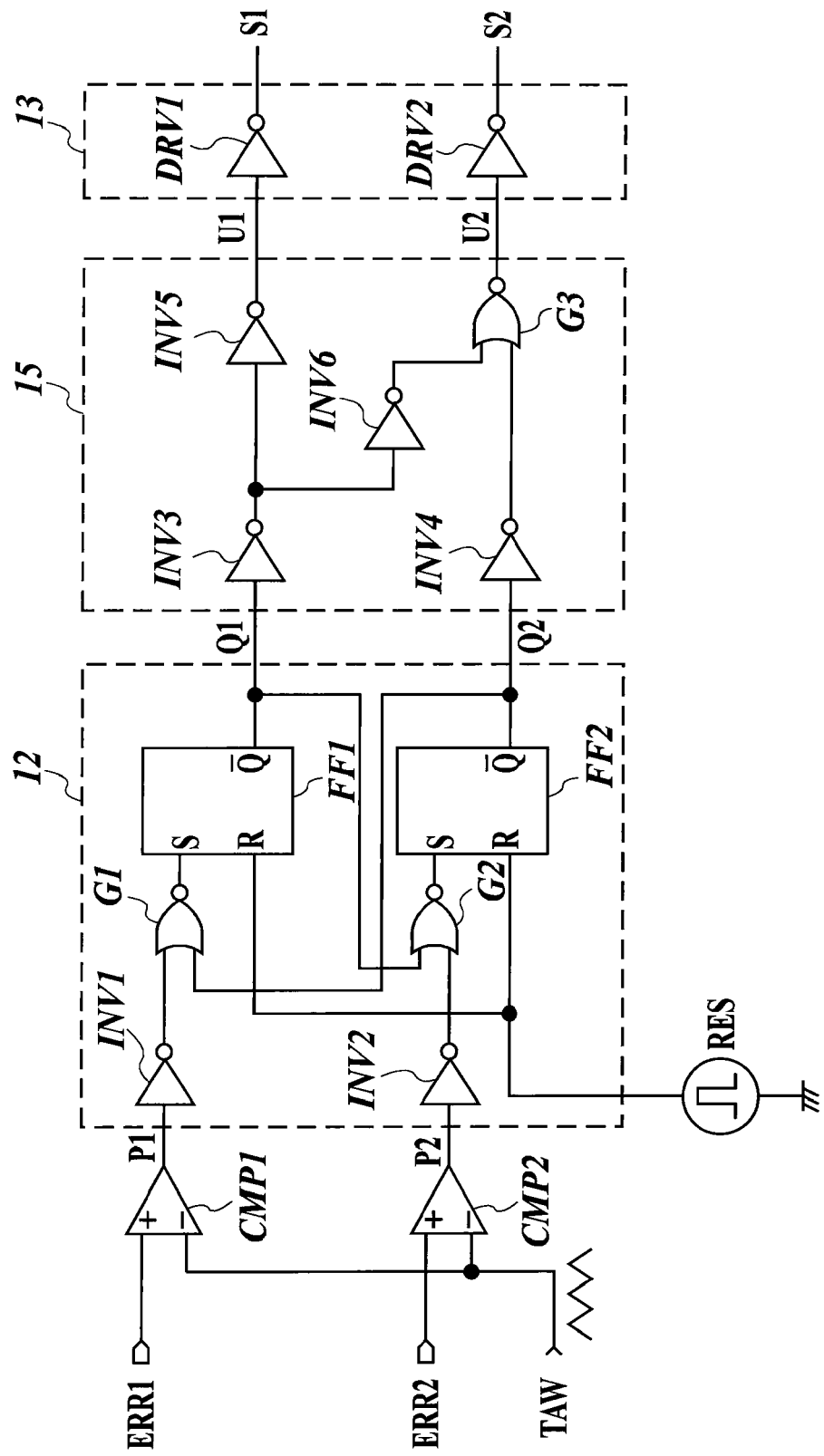
FIG. 2 is a block diagram showing a more concrete configuration of an output selection circuit of the multi-output type DC/DC converter of the first embodiment.

FIG. 2 shows a concrete configuration example of the output selection circuit 12.

The output selection circuit 12 is composed of inverters INV1 and INV2 inverting the PWM control pulses P1 and P2, which are the respective outputs of the PWM comparators CMP1 and CMP2, NOR logic gate circuits G1 and G2, to one input terminal of each of which each of the outputs of the inverters INV1 and INV2 is input, respectively, and flip flops FF1 and FF2, to the set terminals S of which each of the outputs of the NOR logic gate circuits G1 and G2 is input, respectively, and to the reset terminals R of which a reset signal RES from the reset circuit 14 are commonly input. Then, the output terminals of the flip flops FF1 and FF2 are crossly joined with the other input terminals of the NOR logic gate circuits G2 and G1, respectively, and thereby the output selection circuit 12 operates as the selection circuit that selects any earlier risen one of the PWM control pulses P1 and P2 to output the selected pulse and intercepts the other later risen one.

Hereupon, if the output selection circuit 12 of FIG. 2 is examined, the output selection circuit 12 is configured so that one of the flip flops FF1 and FF2 is set by the pulse that has risen earlier between the PWM control pulses P1 and P2, and that the output of the set flip flop is fed back to the NOR gate G2 or G1 on the other path to close the gate for intercepting the other pulse. The flip flops FF1 and FF2 severally have a delay time. Consequently, if the two pulses P1 and P2 are input during a time shorter than the delay time, it can be considered that both of the flip flops FF1 and FF2 are set and both of the outputs Q1 and Q2 changes to the high level. In the present example, the priority circuit 15 at the subsequent stage selects any one of the outputs Q1 and Q2 (Q1 in the embodiment) of the flip flops FF1 and FF2, and preferentially outputs the selected outputs to the drive circuit 13 when both of the outputs Q1 and Q2 become the high level.

The priority circuit 15 of FIG. 2 is composed of inverters INV3 and INV4 inverting the outputs Q1 and Q2 of the flip flops FF1 and FF2, respectively, inverters INV5 and INV6 inverting the output of the inverter INV3, and a NOR gate G3 receiving the outputs of the inverters INV6 and INV4 as the inputs of the NOR gate G3, and operates as the circuit that gives a priority to the output Q1 by forcibly fixing the output of the NOR gate G3 to the low level when both of the outputs Q1 and Q2 are at the high level. Then, the output signals U1 and U2 of the priority circuit 15 are inverted by drivers DRV1 and DRV2, which are constructed of the inverters having high driving forces, and are output as the on-off drive signals S1 and S2 of the switches SW1 and SW2, respectively.

Incidentally, for example, a signal indicating the state of the whole load and the like are supplied from the output selection circuit 12 to the drive circuit 13 besides the output signals U1 and U2 mentioned above. However, those signals are not directly related to the subject matter of the present invention, the circuits for generating such signals are omitted to be drawn in FIG. 2. Moreover, by replacing the inverter INV5 with the NOR gate G3 and by changing the signal path so that the output of the inverter INV4 is input into the inverter INV6 in the priority circuit 15 of FIG. 2, it is also possible to change the priority circuit 15 so as to give the priority to the output Q2 between the outputs Q1 and Q2 of the output selection circuit 12.

Moreover, the configuration of the priority circuit 15 is not limited to the one shown in FIG. 2, but the circuits of the other formats may be adopted. For example, the circuit in which the inverters INV3 and INV5 are omitted in the priority circuit 15 of FIG. 2 can be also adopted. By omitting the inverter INV3, the timing of intercepting the other signal by the NOR gate G3 can be made to be earlier.

Moreover, although the priority circuit 15 is described to be provided separately from the output selection circuit 12 in the present embodiment, it is also possible to grasp the output selection circuit 12 and the priority circuit 15 as an output selection circuit integrally including both of them (the combination of the output selection circuit 12 and the priority circuit 15 is called as an output selection unit in claims). Moreover, the priority circuit 15 can be regarded as a part of the drive circuit 13 (the drive circuit 13 thus including the priority circuit 15 is called as a drive logic circuit in claims).

Figure 3:
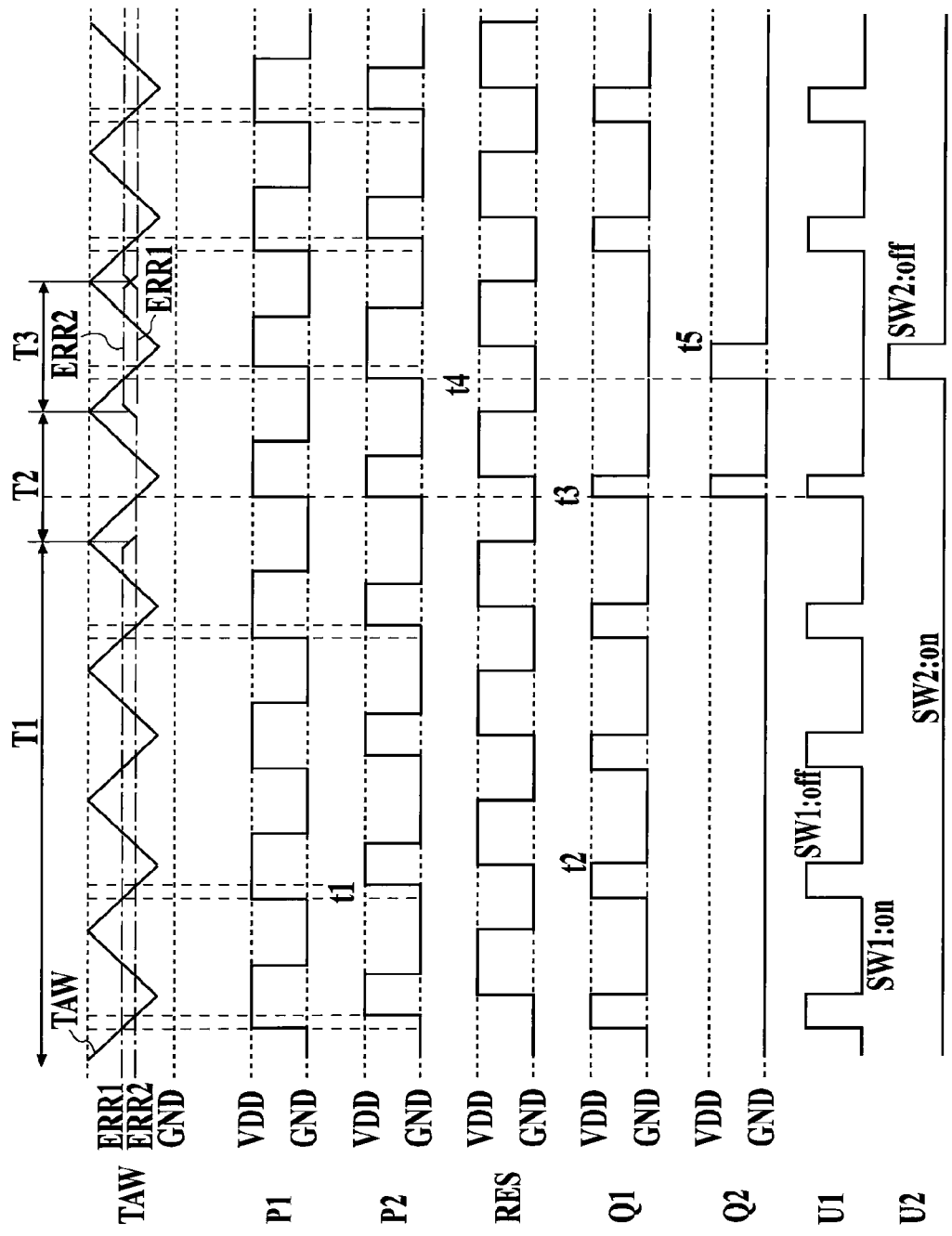
FIG. 3 is a timing chart showing the details of the changes of a reactor current.

Next, the operations of the DC/DC converter 10 of the above embodiment are described using the timing chart of FIG. 3. FIG. 3 shows the changes of the signals at each unit in the case: the output ERR1 of the error amplifier circuit AMP1 is first higher than the output ERR2 of the error amplifier circuit AMP2; both the outputs ERR1 and ERR2 become the same level for a while along the way; after that, the output ERR2 of the error amplifier circuit AMP2 becomes higher than the output ERR1 of the error amplifier circuit AMP1; and further after that, the output ERR1 of the error amplifier circuit AMP1 becomes higher than the output ERR2 of the error amplifier circuit AMP2. In the period T1 during which the output ERR1 of the error amplifier circuit AMP1 is higher than the output ERR2 of the error amplifier circuit AMP2, the level of the triangular wave TAW first reaches the output ERR1 of the error amplifier circuit AMP1 when the level falls. Consequently, the output pulse P1 priorly changes to the high level between the output pulses P1 and P2 of the PWM comparators CMP1 and CMP2, respectively, (timing t1).

Thereby, the flip flop FF1 is priorly made to be in the state of being set, and the output Q1 thereof changes to the high level. The NOR gate circuit G2 is thereupon closed by the output Q1 of the flip flop FF1, and the flip flop FF2 becomes the state of not being set even if the output pulse P2 of the PWM comparator CMP2 is input. Then, the output Q2 of the flip flop FF2 stays in the low level. The output Q1 of the flip flop FF1, which has changed to the high level, is changed to the low level in synchronization with a rise of the reset signal RES (timing t2).

The timing t2 agrees with the lower vertex of the triangular wave TAW. The drive signal S1 is made to the low level in response to the change of the output Q1 to the high level, and thereby the switch SW1 is turned off. Then, the current flowing through the reactor L is made to flow to the output terminal OUT1 through the diode D1, and thereby the boosted voltage Vout1 is output. When the output ERR1 is higher than the output ERR2, the higher the output ERR1 is, the wider the pulse widths of the output Q1 of the flip flop FF1 and the output U1 of the priority circuit 15 are made to be, and the pulse width of the negative drive signal S1, which is the output of the driver DRV1, of the switch SW1 is made to be wider according to the widening of the pulse widths of the outputs Q1 and U1. Moreover, the lower the output ERR1 is, the narrower the negative pulse width of the drive signal S1 of the switch SW1 is made to be. Thereby, the converter 10 is configured to make feedback work so as to lessen the change of the output voltage Vout1 when the output voltage Vout1 changes. Incidentally, because the drive signal S1 is the signal having a phase reversed to that of the output U1 of the priority circuit 15 and the drive signal S2 is the signal having a phase reversed to that of the output U2 of the priority circuit 15, those signals S1 and S2 are omitted to be shown.

When the switch SW1 is repeatedly turned off and the boosting operation is continuously performed as in the period T1, electric charges are not supplied to the smoothing capacity C2, and consequently the output voltage Vout2 gradually rises (the absolute value thereof decreases). Then, as shown in the period T2 of FIG. 3, the output ERR2 of the error amplifier circuit AMP2 and the output ERR1 of the error amplifier circuit AMP1 become almost the same. In this period, because the level of the triangular wave TAW comes to cross the output ERR2 of the error amplifier circuit AMP2 and the output ERR1 of the error amplifier circuit AMP1 almost at the same time, the output pulses P1 and P2 of the PWM comparators CMP1 and CMP2, respectively, are led to be changed to the high level at the same time (timing t3). When these pulses P1 and P2 are supplied to the drive circuit 13, the drive signals S1 and S2 are sometimes not formed in the case of the drive circuit 13 adopting the circuit format of forbidding the simultaneous changes of the inputs to the high level, for example. However, the present embodiment is provided with the priority circuit 15, and gives priority to the pulse P1 when the pulses P1 and P2 are input at the same time. Consequently, the embodiment operates so that a pulse is generated only at the output U1 between the outputs U1 and U2 of the priority circuit 15, and that no pulse is generated at the output U2, as shown in FIG. 3. Thus, the drive circuit 15 changes the drive signal S1.

After that, when the output ERR2 of the error amplifier circuit AMP2 becomes higher than the output ERR1 of the error amplifier circuit AMP1 as in the period T3 of FIG. 3, the level of the triangular wave TAW first reaches the output ERR2 of the error amplifier circuit AMP2 when the level falls in this period, and consequently the output pulse P2 between the output pulses P1 and P2 of the PWM comparators CMP1 and CMP2, respectively, is led to priorly change to the high level (timing t4).

Thereby, the flip flop FF2 is priorly made to be in the set state thereof, and the output Q2 thereof changes to the high level. Thereupon, the NOR gate circuit G1 is closed by the output Q2 of the flip flop FF2, and the flip flop FF1 is made to be not set even if the output pulse P1 of the PWM comparator CMP1 is input. Consequently, the output Q1 of the flip flop FF1 stays at the low level. The output Q2 of the flip flop FF2, which has changed to the high level, is changed to the low level in synchronization with a rise of the reset signal RES (timing t5). The timing t5 agrees with the lower vertex of the triangular wave TAW. The output U2 of the priority circuit 15 changes to the high level in response to the change of the output Q2 to the high level, and the drive signal S2 is changed to the low level. Consequently, the switch SW2 is turned off, and the current flowing through the reactor L operates so as to draw therein a current from the output terminal OUT2 through the diode D2. Thereby, a lower inverted voltage Vout2 is output.

After that, when the voltage Vout2 falls to make the output ERR1 of the error amplifier circuit AMP1 higher than the output ERR2 of the error amplifier circuit AMP2, the output pulse P1 of the PWM comparator CMP1 comes to priorly change to the high level, and the flip flop FF1 is priorly made to the set state thereof. Then, the output Q1 changes to the high level, and the output U1 of the priority circuit 15 becomes the high level in response to the change of the output Q1 to the high level, and the drive signal S1 is changed to the low level. Thereby, the switch SW1 is turned off, and the current flowing through the reactor L is made to flow to the output terminal OUT1 through the diode D1. Thus, the boosted voltage Vout1 is led to be output again.

As described above, the present embodiment does not perform the repetition of a boosting operation and an inverting operation during a fixed period, but performs the switching control so that the rate of the boosting operations and the inverting operations is automatically changed according to the levels of the output voltages Vout1 and Vout2, i.e. the relative weights of loads, at each occasion.

Figure 4:
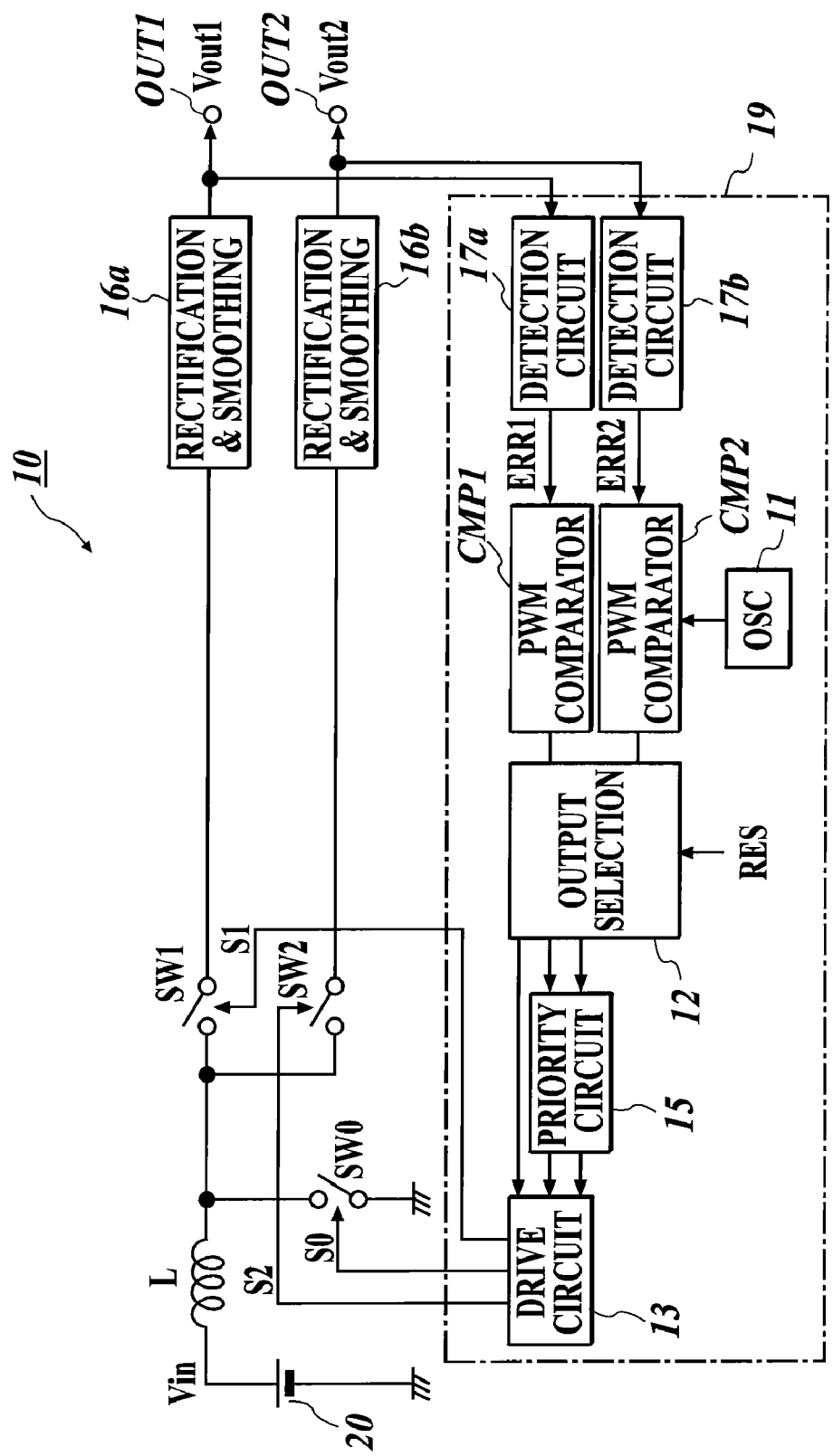
FIG. 4 is a configuration diagram showing a multi-output type DC/DC converter of a second embodiment of the present invention.

FIG. 4 is a configuration diagram showing a multi-output type DC/DC converter of a second embodiment of the present invention.

The multi-output type DC/DC converter 10 of the embodiment is a boosting & boosting type converter including a reactor L, a switch SW0 provided between the reactor L and the ground, which switch SW0 intermittently applies an input voltage Vin to the reactor L by the on-off action of the switch SW0 to accumulate energy in the reactor L, a first rectification & smoothing circuit 16a provided between the reactor L and a first output terminal OUT1, a second rectification & smoothing circuit 16b provided between the reactor L and the second output terminal OUT2, a switch SW1 connected between the reactor L and the first rectification & smoothing circuit 16a, and a switch SW2 connected between the reactor L and a second rectification & smoothing circuit 16b. Furthermore, the multi-output type DC/DC converter 10 includes a first detection circuit 17a detecting a first output voltage Vout1, a second detection circuit 17b detecting a second output voltage Vout2, a signal generation circuit 11 generating a triangular wave TAW having a predetermined frequency and a reset, PWM comparators CMP1 and CMP2 comparing the generated triangular wave with outputs ERR1 and ERR2 of the detection circuits 17a and 17b to generate PWM control pulses P1 and P2, respectively, an output selection circuit 12 selecting an output pulse that has risen earlier between the outputs of the comparators CMP1 and CMP2 to generate a signal for performing the on-off control of the switches SW0-SW2 in response to the selected pulse, a drive circuit 13 generating on-off drive signals S0-S2 in response to the control signal from the output selection circuit 12 to apply the generated drive signals S0-S2 to the switches SW0-SW2, respectively, and a priority circuit 15 preferentially outputs any one of control signals Q1 and Q2 from the output selection circuit 12 to the drive circuit 13 when the control signals Q1 and Q2 are simultaneously input into the priority circuit 15. The output detection circuits 17a and 17b, the PWM comparators CMP1 and CMP2, the triangular wave generation circuit 11, the output selection circuit 12, the priority circuit 15 and the drive circuit 13 constitute a switching control circuit 19.

Each of the rectification & smoothing circuits 16a and 16b can be constructed of a diode connected between the reactor L and each of the output terminals OUT1 and OUT2 in the forward direction, and a smoothing capacitor connected between the cathode side terminal of the diode and the ground. Each of the detection circuits 17a and 17b can be constructed of a resistance voltage dividing circuit performing the voltage division of each of the output voltages Vout1 and Vout2, and an error amplifier circuit comparing the divided voltage with a predetermined reference voltage to output a voltage according to the electric potential difference.

The DC/DC converter 10 of the embodiment turns on the switch SW0 to accumulate energy into the reactor L, and turns off the switch SW0 and turns on any one of the switches SW1 and SW2 to output the boosted voltages Vout1 and Vout2 to the output terminals OUT1 and OUT2, respectively. Also the present embodiment is configured to select the output pulse that has earlier risen between the outputs P1 and P2 of the PWM comparators CMP1 and CMP2, respectively, with the output selection circuit 12, and to generate the on-off control signals of the switches SW0-SW2 according to the selected pulse to output the on-off drive signals S0-S2 of the switches SW0-SW2, respectively, with the drive circuit 13.

Thereby, the present embodiment does not repeat a boosting operation and an inverting operation at a fixed period, but performs switching control so that the rate between the boosting operations and the inverting operations automatically changes according to the levels of the output voltages Vout1 and Vout2, i.e. the relative weights of loads, at each occasion. Moreover, because the priority circuit 15 is provided between the output selection circuit 12 and the drive circuit 13, any one of the high level control signals Q1 and Q2 is supplied to the drive circuit 13 even when the high level control signals Q1 and Q2 are simultaneously output from the output selection circuit 12. Consequently, the production of the undesired situation in which drive signals S0-S2 are not formed can be avoided. The advantages can be obtained also in the following embodiments.

Figure 5:
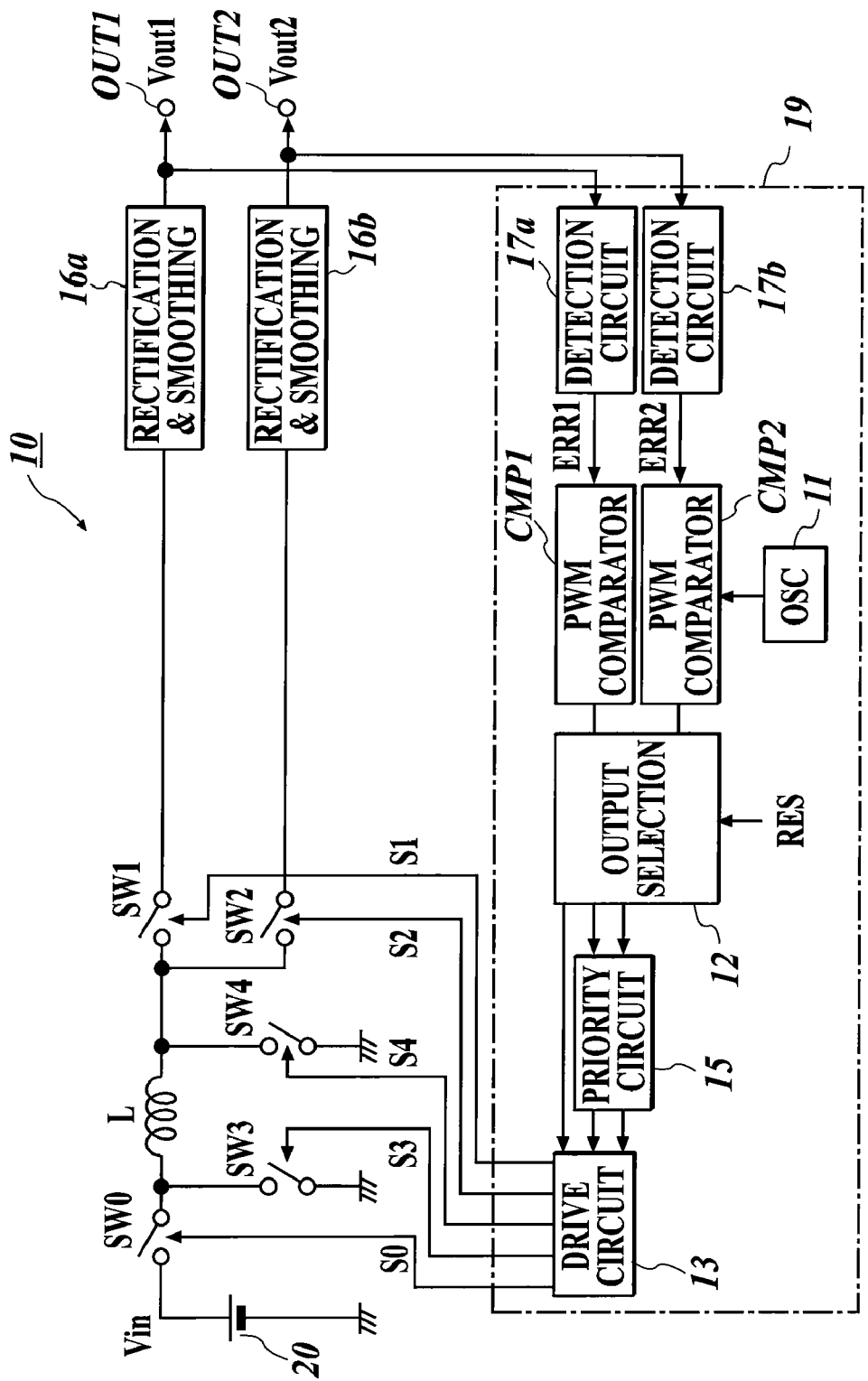
FIG. 5 is a configuration diagram showing a multi-output type DC/DC converter of a third embodiment of the present invention.

FIG. 5 is a configuration diagram showing a multi-output type DC/DC converter of a third embodiment of the present invention.

The multi-output type DC/DC converter 10 of the embodiment is a boosting & stepping down type converter including a reactor L, a switch SW0 provided between a direct-current power supply 20, and the reactor L and the ground, which switch SW0 intermittently applies an input voltage Vin to the reactor L by the on-off action of the switch SW0 to accumulate energy in the reactor L, a switch SW3 provided between one terminal of the reactor L and the ground, a switch SW4 provided between the other terminal of the reactor L and the ground, a switch SW1 connected between the reactor L and a first rectification & smoothing circuit 16a, and a switch SW2 connected between the reactor L and a second rectification & smoothing circuit 16b.

The multi-output type DC/DC converter 10 of the embodiment can output a voltage obtained by boosting the input voltage Vin to the output terminal OUT1, and can output a voltage obtained by stepping down the input voltage Vin to the output terminal OUT2, by changing the timing of the switches SW0-SW4. Moreover, because the output selection circuit 12 selects the output pulse that has earlier risen between the outputs P1 and P2 of the PWM comparators CMP1 and CMP2, respectively, and generates the on-off control signals of the switches SW0-SW2 according to the selected pulse, the present embodiment does not repeat the boosting operation on the side of the output terminal OUT1 and the stepping down operation on the side of the output terminal OUT2 at a fixed period, but performs switching control so that the rate between the boosting operations on the side of the output terminal OUT1 and the stepping down operations on the side of the output terminal OUT2 automatically changes according to the relative weights of loads.

Figure 6:
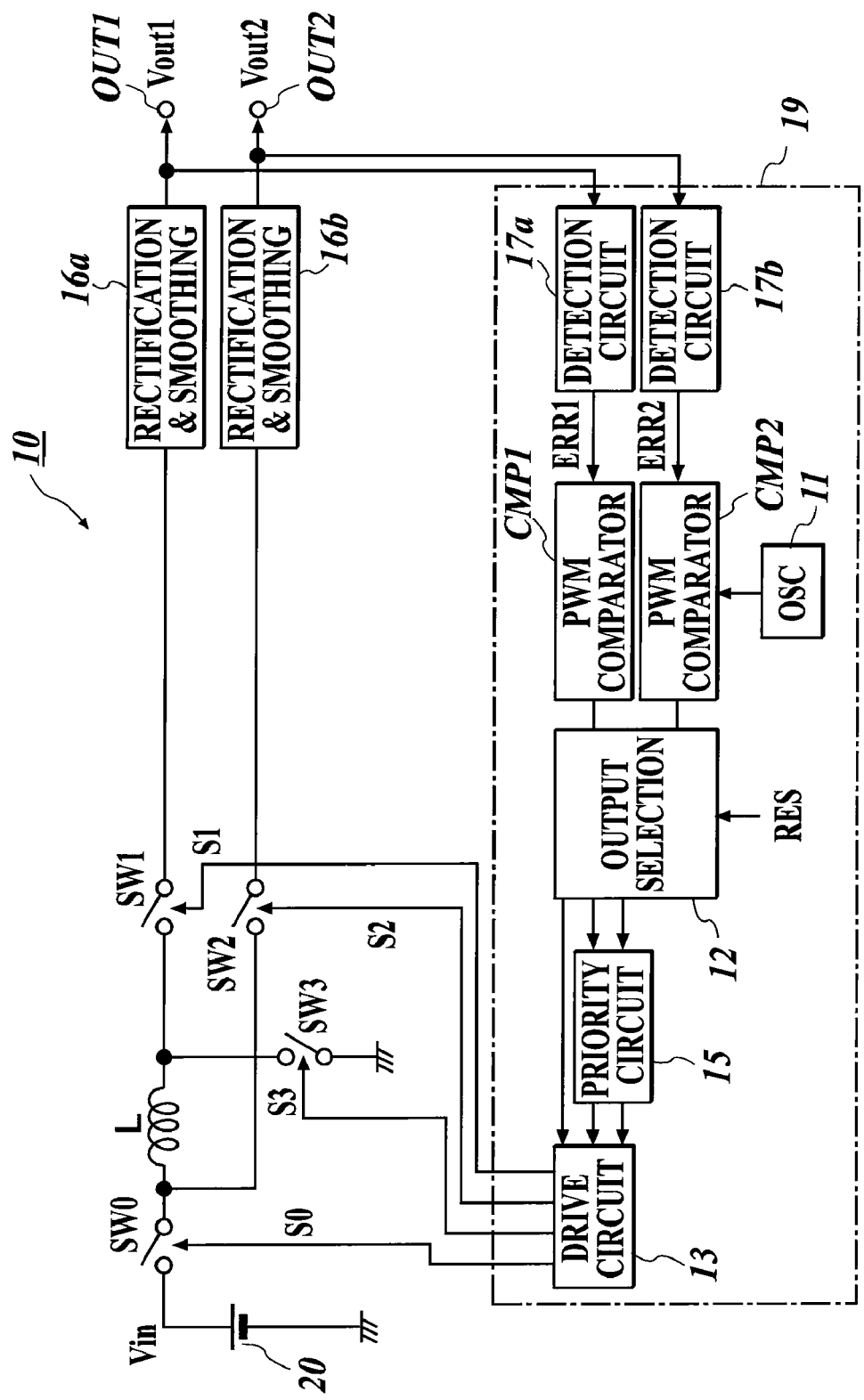
FIG. 6 is a configuration diagram showing a multi-output type DC/DC converter of a fourth embodiment of the present invention.

FIG. 6 is a configuration diagram showing a multi-output type DC/DC converter of a fourth embodiment of the present invention.

The multi-output type DC/DC converter 10 of the embodiment is a boosting & inverting type converter including a reactor L, a switch SW0 provided between a direct-current power supply 20 and the reactor L, which switch SW0 intermittently applies an input voltage Vin to the reactor L by the on-off action of the switch SW0 to accumulate energy in the reactor L, a switch SW3 provided between the other terminal of the reactor L and the ground, a switch SW1 connected between the reactor L and a first rectification & smoothing circuit 16a, and a switch SW2 connected between the reactor L and a second rectification & smoothing circuit 16b.

The multi-output type DC/DC converter 10 of the embodiment can output a voltage obtained by boosting the input voltage Vin to the output terminal OUT1, and can output a negative voltage obtained by inverting the input voltage Vin to the output terminal OUT2, by changing the timing of the switches SW0-SW3. Moreover, because the output selection circuit 12 selects the output pulse that has earlier risen between the outputs P1 and P2 of the PWM comparators CMP1 and CMP2, respectively, and generates the on-off control signals of the switches SW0-SW3 according to the selected pulse, the present embodiment does not repeat the boosting operation on the side of the output terminal OUT1 and the inverting operation on the side of the output terminal OUT2 at a fixed period, but performs switching control so that the rate between the boosting operations on the side of the output terminal OUT1 and the inverting operations on the side of the output terminal OUT2 automatically changes according to the relative weights of loads.

Figure 7:
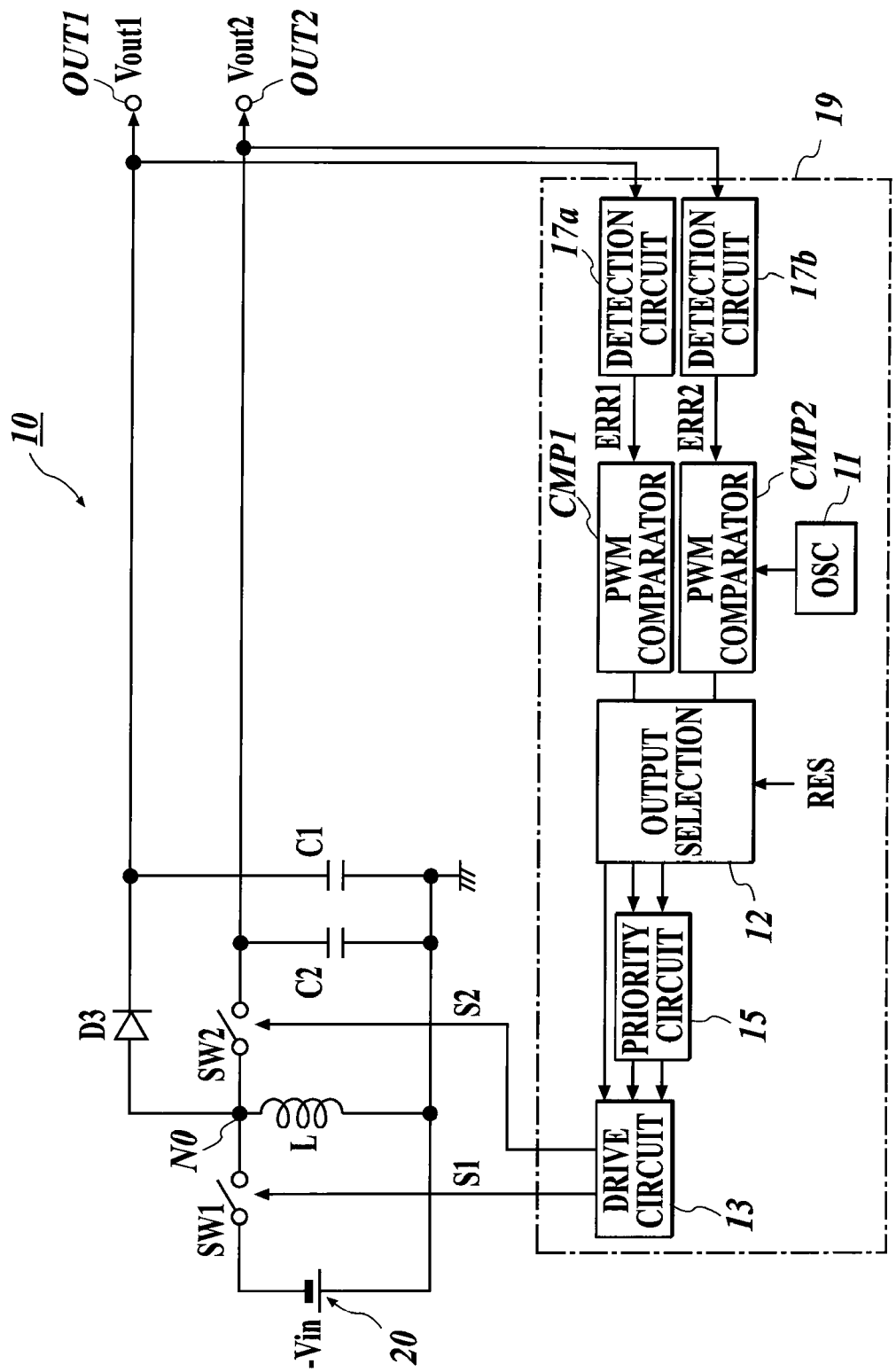
FIG. 7 is a configuration diagram showing a multi-output type DC/DC converter of a fifth embodiment of the present invention.
Figure 8:
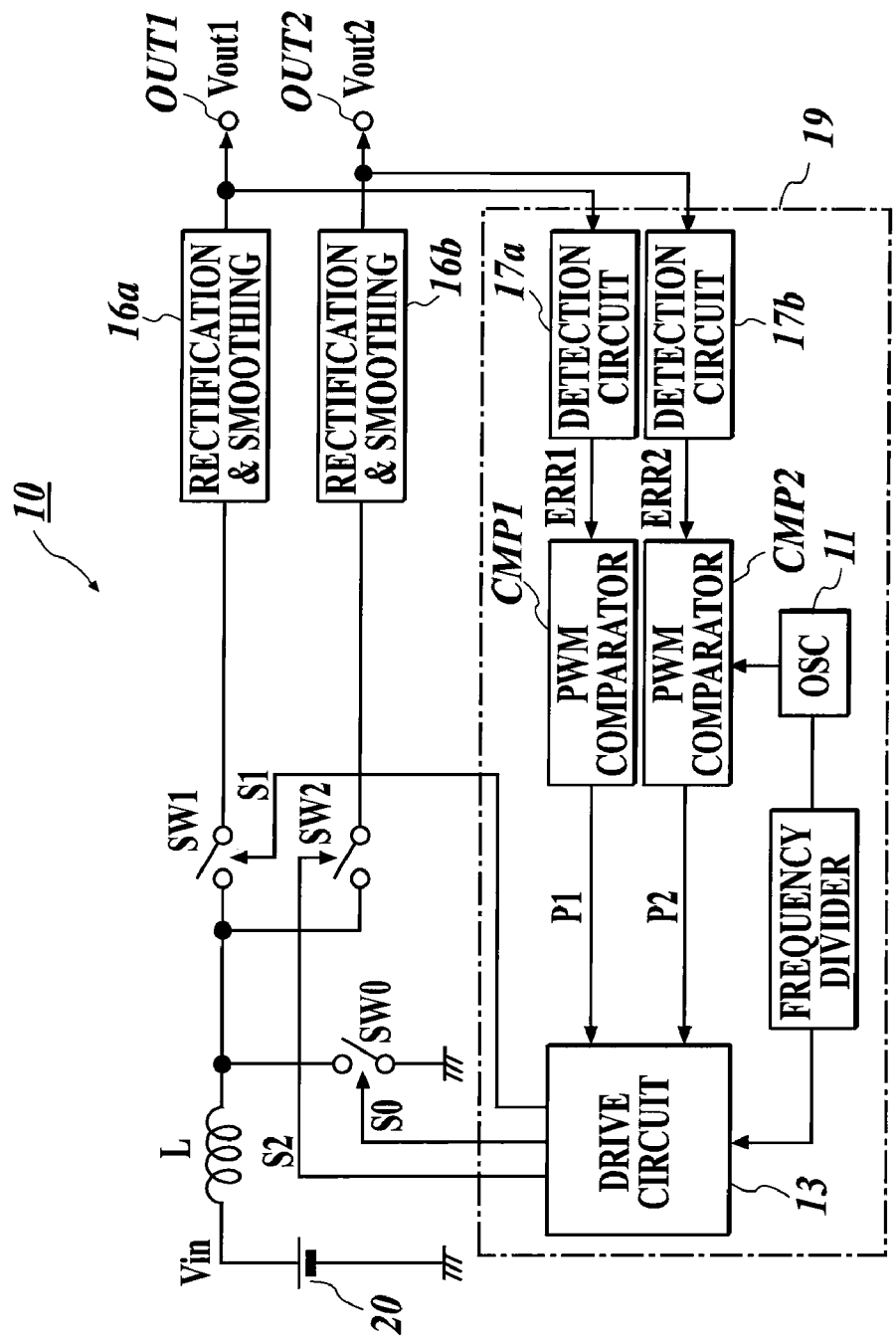
FIG. 8 is a configuration diagram showing an example of a conventional multi-output type DC/DC converter.

FIG. 7 is a configuration diagram showing a multi-output type DC/DC converter of a fifth embodiment of the present invention.

The multi-output type DC/DC converter 10 of the embodiment is a boosting and stepping down & boosting and stepping down type converter including a reactor L, a switch SW1 provided between a direct-current power supply 20 and the reactor L, which switch SW1 intermittently applies an input voltage Vin to the reactor L by the on-off action of the switch SW1 to apply a backward direction current to the reactor L and to accumulate energy in the reactor L, a diode D3 as a two-terminal switching device, which diode D4 is connected between a connection node N0 of the reactor L and the switch SW1 and a first output terminal OUT1 in the forward direction, and a switch SW2 connected between the connection node N0 and a second output terminal OUT2.

The multi-output type DC/DC converter 10 of the embodiment turns on the switch SW1 to accumulate energy in the reactor L, and then turns off the switch SW1 and turns on the SW2 to supply electric charges to a smoothing capacity C2 on the side of the output terminal OUT2. Then, an output voltage Vout2 boosted or stepped down according to the accumulated energy and the on-time of the switch SW1 is output to the output terminal OUT2. Moreover, when the switches SW1 and SW2 are turned off after the switch SW1 has been turned on to accumulate energy in the reactor L, electric charges are supplied to a smoothing capacity C1 on the side of the output terminal OUT1, or an output voltage Vout1 boosted or stepped down according to the off-time of the switches SW1 and SW2 is output to the output terminal OUT1.

Incidentally, the present invention is not limited to the above embodiments, but various modifications can be performed. For example, the above embodiments severally use a triangular wave having a predetermined inclination in the rise thereof and in the fall thereof as a waveform signal of a predetermined frequency compared in the PWM comparators CMP1 and CMP2, a sawtooth wave, which has a predetermined inclination only in the rise thereof, may be used. Moreover, in the above embodiments, different voltages (Vref1, Vref2) are used as the reference voltages of the error amplifier circuits AMP1 and AMP2, it is also possible to configure each of the embodiments to be able to used the same reference voltage by appropriately setting the ratio of the divided resisters R1 and R2 and the ratio of the divided resistors R3 and R4.

Moreover, in the above embodiments, the examples of two-outputs type DC/DC converters have been shown, it is also possible to deal with three outputs or more by increasing the number of the output terminals and the number of the change-over switches. Moreover, in the above fifth embodiment (FIG. 7), the diode D3, which is the two-terminal switch device, is used as the switch for applying the current of the reactor to the first output terminal OUT1, but a three-terminal switch device such as a transistor, which is turned on and off in accordance with a control signal, may be used. In addition, the circuits such as the detection circuits of the output voltages and oscillation circuit are not limited to the concretely shown ones in the embodiments, and the circuits can be suitably changed without departing from the sprit and the scope of the present invention.

According to an embodiment of the invention, the multi-output type DC/DC converter includes: an output voltage detection unit; a comparison circuit (PWM comparator) to each output; and an output selection unit to monitor outputs of the comparison circuits to select an earlier output, and to generate on-off control signals of switching circuits switching the path of a current flowing through the reactor, and to treat the plurality of control signals in accordance with a previously determined priority order when the outputs of the plurality of comparison circuits change almost at the same time.

Concretely, the multi-output type DC/DC converter may includes:

a reactor connected to a direct-current power supply;

a first switching circuit including one or more switches to apply a current to the reactor;

a second switching circuit including one or more switches to switch an output from the reactor to any one of a plurality of output terminals;

a plurality of output voltage detection units to detect voltages of the plurality of output terminals;

a plurality of comparison circuits to compare outputs of the plurality of output voltage detection units with a waveform signal of a predetermined frequency;

an output selection circuit to receive outputs of the plurality of comparison circuits as inputs, the output selection circuit selecting an output of a comparison circuit, the output having an earlier rise or an earlier fall, to generate a plurality of control signals pertaining to on and off of the first switching circuit and/or the second switching circuit; and a priority circuit to treat the plurality of control signals in accordance with a predetermined priority order when the plurality of control signals of the output selection circuit change almost at the same time, wherein a current generated by a discharge of energy accumulated in the reactor is output to any one of the plurality of output terminals in accordance with the control signals generated by the output selection unit.

Hereupon, the currents output from the output terminals include not only positive currents, i.e. discharge currents, but also negative currents, i.e. drawing currents.

According to such a configuration, the repetition of the operations of boosting and stepping down at a fixed period in each output is not performed, but the switching control of automatically changing the rate between the operations of boosting and stepping down according to the levels of the output voltages, i.e. the relative weights of the loads, at each time, is led to be performed. Consequently, it becomes possible to prevent the output voltages from greatly shifting from the desired electric potentials owing to the changes of the loads, and to output stable direct-current voltages. Moreover, because the priority circuit is provided, even if high level control signals are simultaneously output from the output selection circuit, any one of them is supplied to a drive circuit, and it is possible to avoid the occurrence of an undesired situation in which no drive signals of the switching circuits are formed.

Preferably, the output selection circuit includes:

a plurality of flip flop circuits provided correspondingly to each of the plurality of comparison circuits, states of the flip flop circuits being changed by rises or falls of the outputs of the plurality of comparison circuits; and a plurality of logic gate circuits preventing transfer of changes of the outputs of the comparison circuits corresponding to the other flip flop circuits to the other flip flop circuits when a state of any one of the plurality of flip flop circuits is changed.

Thereby, the output having an earlier rise or an earlier fall is securely selected from the outputs of the plurality of comparison circuits with a comparatively simple circuit, and the signals for switching control can be generated.

The waveform signal of the predetermined frequency may be a triangular wave and the plurality of flip flop circuits may be configured to be reset by a signal changing in synchronization with a changing point of the triangular wave. The flip flop circuits the states of which have been changed by the outputs of the comparison circuits are needed to be reset for the judgment at the next cycle. By forming the reset signals for that sake to be the signals synchronized with changing points of the triangular wave, the reset signals can be easily generated.

Each of the plurality of output voltage detection units may be an error amplifier circuit to output a voltage according to an electric potential difference between a voltage obtained by resistance division of each of the voltages of the plurality of output terminals and a predetermined reference voltage.

Each of the plurality of comparison circuits may be a PWM comparator to compare an output of the error amplifier circuit with the waveform signal of the predetermined frequency to output a pulse signal having a pulse width according to an output voltage of the error amplifier circuit.

Because the error amplifier circuits and the PWM comparators are the ones that have been generally used in conventional switched mode power supply circuits, it is possible to configure a DC/DC converter performing desired operations without performing drastic design changes by using the error amplifier circuits and the PWM comparators.

The multi-output type DC/DC converter may further include a drive circuit to output a signal performing on-off drive of the first switching circuit and a signal performing on-off drive of the second switching circuit, based on a control signal generated by the output selection circuit.

Because the switch for applying the current to the reactor has a large size, a comparatively large driving force is needed for turning on and off the switch. Accordingly, by providing the drive circuit at the subsequent stage of the output selection circuit, the sizes of the devices constituting the output selection circuit can be made to be small, and the total circuit area can be made to be small. Incidentally, the function of treating the plurality of control signals in accordance with the predetermined priority order when the plurality of control signals generated by the output selection circuit change almost at the same time may be provided to the drive circuit.

According to the invention, there can be obtained the advantages that it becomes possible to prevent the output voltages from greatly shifting from the desired electric potentials owing to the changes of the loads to output stable direct-current voltages, and that, even if the outputs of the comparison circuits, which are provided to the respective plural outputs, change almost at the same time, an undesired control state does not arise in a multi-output type DC/DC converter that intermittently applies an input voltage to a reactor to flow a current and distributes the output of the reactor to a plurality of output terminals in the time division method for outputting a plurality of voltages.

The entire disclosure of Japanese Patent Application No. 2006-163252 filed on Jun. 13, 2006 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follows.

What is claimed is:

1. A multi-output type DC/DC converter comprising:
a reactor connected to a direct-current power supply;
a first switching circuit including one or more switches to apply a current to the reactor;
a second switching circuit including one or more switches to switch an output from the reactor to any one of a plurality of output terminals;
a plurality of output voltage detection units to detect voltages of the plurality of output terminals;
a plurality of comparison circuits to compare outputs of the plurality of output voltage detection units with a waveform signal of a predetermined frequency; and
an output selection unit to receive outputs of the plurality of comparison circuits as inputs, the output selection unit selecting an output of a comparison circuit, the output having an earliest rise or an earliest fall, to generate a plurality of control signals pertaining to on and off of at least one of the first switching circuit and the second switching circuit, the output selection unit treating the plurality of control signals in accordance with a predetermined priority order when the outputs of the plurality of comparison circuits change almost at the same time, wherein a current generated by a discharge of energy accumulated in the reactor is output to any one of the plurality of output terminals in accordance with the control signals generated by the output selection unit.

2. A multi-output type DC/DC converter comprising:
a reactor connected to a direct-current power supply;
a first switching circuit including one or more switches to apply a current to the reactor;
a second switching circuit including one or more switches to switch an output from the reactor to any one of a plurality of output terminals;
a plurality of output voltage detection units to detect voltages of the plurality of output terminals;
a plurality of comparison circuits to compare outputs of the plurality of output voltage detection units with a waveform signal of a predetermined frequency;
an output selection circuit to receive outputs of the plurality of comparison circuits as inputs, the output selection circuit selecting an output of a comparison circuit, the output having an earliest rise or an earliest fall, to generate a plurality of control signals pertaining to on and off of at least one of the first switching circuit and the second switching circuit; and
a priority circuit to treat the plurality of control signals in accordance with a predetermined priority order when the plurality of control signals of the output selection circuit change almost at the same time, wherein a current generated by a discharge of energy accumulated in the reactor is output to any one of the plurality of output terminals in accordance with the control signals generated by the output selection unit.

3. The multi-output type DC/DC converter according to claim 2, wherein the output selection circuit comprises:
a plurality of flip flop circuits provided correspondingly to each of the plurality of comparison circuits, states of the flip flop circuits being changed by rises or falls of the outputs of the plurality of comparison circuits; and
a plurality of logic gate circuits preventing transfer of changes of the outputs of the comparison circuits corresponding to the other flip flop circuits to the other flip flop circuits when a state of any one of the plurality of flip flop circuits is changed.

4. The multi-output type DC/DC converter according to claim 3, wherein the waveform signal of the predetermined frequency is a triangular wave and the plurality of flip flop circuits is configured to be reset by a signal changing in synchronization with a changing point of the triangular wave.

5. The multi-output type DC/DC converter according to claim 2, wherein each of the plurality of output voltage detection units is an error amplifier circuit to output a voltage according to an electric potential difference between a voltage obtained by resistance division of each of the voltages of the plurality of output terminals and a predetermined reference voltage.

6. The multi-output type DC/DC converter according to claim 3, wherein each of the plurality of output voltage detection units is an error amplifier circuit to output a voltage according to an electric potential difference between a voltage obtained by resistance division of each of the voltages of the plurality of output terminals and a predetermined reference voltage.

7. The multi-output type DC/DC converter according to claim 4, wherein each of the plurality of output voltage detection units is an error amplifier circuit to output a voltage according to an electric potential difference between a voltage obtained by resistance division of each of the voltages of the plurality of output terminals and a predetermined reference voltage.

8. The multi-output type DC/DC converter according to claim 5, wherein each of the plurality of comparison circuits is a comparator to compare an output of the error amplifier circuit with the waveform signal of the predetermined frequency to output a pulse signal having a pulse width according to an output voltage of the error amplifier circuit.

9. The multi-output type DC/DC converter according to claim 8, further comprising a drive circuit to output a signal performing on-off drive of the first switching circuit and a signal performing on-off drive of the second switching circuit, based on a control signal generated by the output selection circuit.

10. A multi-output type DC/DC converter comprising:
- a reactor connected to a direct-current power supply;
- a first switching circuit including one or more switches to apply a current to the reactor;
- a second switching circuit including one or more switches to switch an output from the reactor to any one of a plurality of output terminals;
- a plurality of output voltage detection units to detect voltages of the plurality of output terminals;
- a plurality of comparison circuits to compare outputs of the plurality of output voltage detection units with a waveform signal of a predetermined frequency;
- an output selection circuit to receive outputs of the plurality of comparison circuits as inputs, the output selection circuit selecting an output of a comparison circuit, the output having an earliest rise or an earliest fall, to generate a plurality of control signals pertaining to on and off of at least one of the first switching circuit and the second switching circuit; and
- a drive logic circuit to output a signal performing on-off drive of the first switching circuit and a signal performing on-off drive of the second switching circuit based on the plurality of control signals generated by the output selection circuit, and to treat the plurality of control signals in accordance with a predetermined priority order when the plurality of control signals change almost at the same time, wherein a current generated by a discharge of energy accumulated in the reactor is output to any one of the plurality of output terminals in accordance with the control signals generated by the output selection circuit.

* * * * *